March 31, 1953  R. WESTBURY  2,633,037
COLLAPSIBLE STRUT

Filed May 27, 1950  2 SHEETS—SHEET 1

INVENTOR
ROY WESTBURY

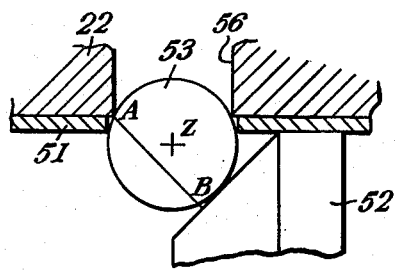
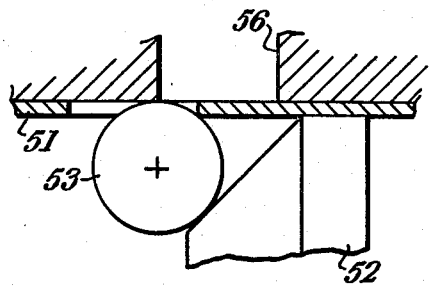
Fig. 2.   Fig. 2a.
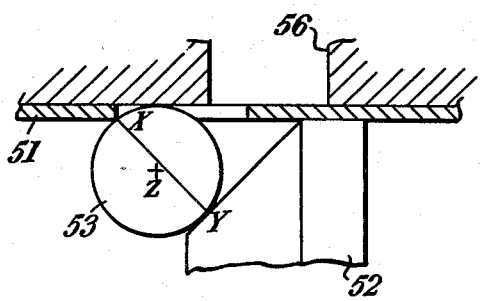
Fig. 2b.
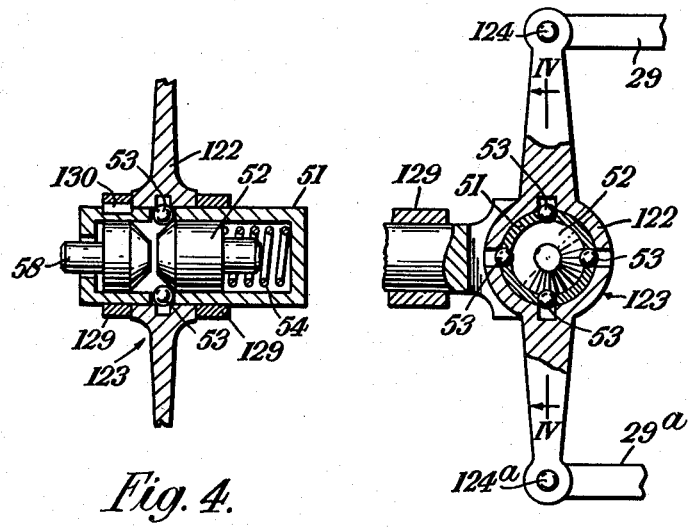
Fig. 4.   Fig. 3.
INVENTOR.
ROY WESTBURY.

Patented Mar. 31, 1953

2,633,037

UNITED STATES PATENT OFFICE 2,633,037

COLLAPSIBLE STRUT

Roy Westbury, Oldbury, Bridgnorth, England, assignor to H. M. Hobson Limited, London, England, a company of Great Britain Application May 27, 1950, Serial No. 164,653
In Great Britain June 2, 1949

6 Claims. (Cl. 74—584)

It is frequently desirable to include, in a mechanism or structure, a member which will collapse under a predetermined load, and it is well known to provide for the purpose a shear pin which has just sufficient strength to support the desired maximum load. The use of a shear pin, however, has the disadvantages that calculation of the collapsing load depends upon a knowledge of the physical properties of the material of which the pin is made and that the pin is destroyed and must be replaced after each collapse.

The object of this invention is to provide a member, which will collapse under a load which can be determined exactly by testing with deadweights, a spring balance or other apparatus which will apply a known force, and collapse of which does not involve the rupture of any part of the structure, so that the member may be reset after use, and used time after time for collapse at the load to which it has been set.

The collapsible member according to the invention comprises an outer housing, an inner tube fitting within a cavity in the housing, a ball having its inner and larger portion within the tube and its outer and smaller portion projecting through a hole in the tube, which is too small to pass the ball, and into a smaller hole in the housing, a plunger mounted to slide in the tube and having a tapered head, and a spring pressing the head of the plunger against the ball so as to urge the latter to a position in which it cooperates with the holes in the tube and in the housing to resist movement of the tube in relation to the cavity, the arrangement being such that the ball is movable, on application of a predetermined force tending to move the tube relatively to the housing, to a position in which its centre lies inward of the line, normal to the tapered head of the plunger, through the point in the rim of the hole against which the ball is pressed by the plunger.

The ball resists axial movement of the tube in relation to the housing, since such movement must cause inward movement of the ball down the cooperating inclined face of the tapered head of the plunger and consequent movement of the plunger against its spring. When, however, a load tending to cause the tube to move axially in relation to the housing reaches a predetermined value, the ball is moved inwards sufficiently to cease offering resistance to movement of the tube, and the tube can move freely in relation to the housing. The collapsible member is thus collapsed.

The collapsible member according to the invention will remain collapsed until it is reset. In order to achieve this it is necessary that the parts should be so dimensioned that the ball may be moved, by relative movement of the tube and housing, to a position point in which its centre lies inward of the line drawn normally to the inclined face of the plunger from the point on the rim of the hole in the inner tube against which the plunger is pressing the ball. The ball will then be caused to travel further inwards under the action of the spring or, failing this, friction will be effective to maintain the ball in the collapsed position.

Where, as is preferred, the cavity in the housing and the tube are both of circular section, the ball will also resist rotation of the tube in relation to the housing, since such movement of the tube will also result in inward movement of the ball down the inclined face of the tapered head of the plunger; but the member will again collapse when the load tending to rotate the tube in the housing reaches a predetermined value.

The device can readily be reset, after bringing the holes in the tube and the housing into alignment, by inserting a cone ended plunger into the end of the tube remote from the spring pressed plunger, and so pressing the ball outwardly into its original position.

While reference has been made to but one ball, the collapsible member according to the invention will normally include a number of balls spaced circumferentially in relation to the tube and accommodated each in a pair of cooperating holes in the tube and outer housing of the kind described above.

The hole or holes in the tube will normally be of such size that, in the unloaded condition, each ball is a close fit in the cooperating hole in the tube—otherwise there will be lost motion between the tube and the ball—and the tapered face of the plunger is conveniently inclined at 45° to the axis of the tube.

The collapsible member according to the invention has a wide range of use, but it is particularly useful as a link associated with a manual operating member for imparting movement to the control valve of a hydraulic jack or motor, which will collapse, in the event of the control valve seizing in its guide, and thereby cause operation of a valve to cut-off the supply of pressure liquid to the control valve or to open a passage between opposite ends of the jack cylinder, or to achieve both of these effects. Alternatively collapse of the link may be arranged to operate a warning signal or to initiate operation of an emergency servomotor or the like for operating the load in place of the failed servomotor.

Two forms of collapsible member according to the invention will now be described in detail, by way of example, with reference to the accompanying drawings, in which—

Figs. 2, 2a and 2b are enlarged diagrammatic sectional views of part of the collapsible member showing the same in alternative positions.

Fig. 3 is an end view, partly in section, of a collapsible member according to the invention which is arranged to collapse under a given torsional load, and Fig. 4 is a section on the line IV—IV in Fig. 3.

Like reference numerals indicate like parts throughout the figures.

Figure 1:
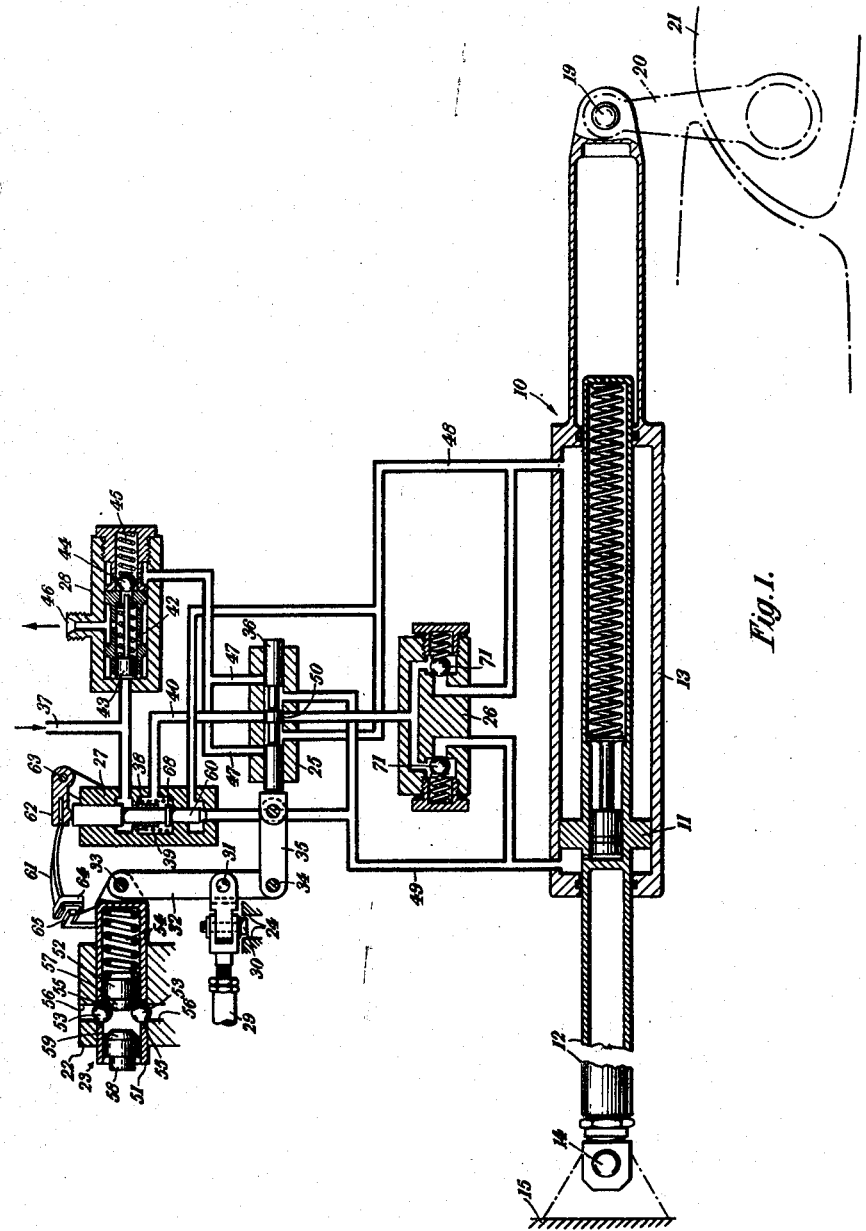
Fig. 1 is a diagrammatic view of a hydraulic jack for operating the control surface of an aircraft and embodying a collapsible member arranged to collapse under a given axial load.

Considering Fig. 1, first of all, the installation shown therein will be but briefly described, as it is fully explained in U. S. application Serial No. 164,654, now Patent No. 2,597,418. It includes a hydraulic jack 10, the piston 11 of which carries a piston rod 12, which projects from the jack cylinder 13 and is pivoted at 14 to a fixed point 15 of the aircraft structure.

The cylinder 13 is pivoted, at 19, to an output member 20 for applying movement, as the cylinder 13 moves in relation to the jack piston 11, to an aileron or other control surface 21.

Fixed to the cylinder 13 are—

(a) the housing 22 of a collapsible member 23,
(b) a pair of stops 24,
(c) a control valve housing 25,
(d) the housing 26 of a pair of non-return valves 71,
(e) the housing 27 of a supply check valve and a jack by-pass valve, and
(f) the housing 28 of a return check valve.

Fig. 1 being purely diagrammatic, the connections between the cylinder 13 and the parts 22 and 24—28 are not shown therein.

An input member 29, connected to the pilot's control column, carries a projection 30 which moves with clearance between the stops 24 during normal operation of the jack. The input member 29 is pivoted at 31 to a link 32 pivoted at one end, 33, to the collapsible member 23 and at the other end, 34, to a link 35 for imparting movement to the control valve 36 of the jack.

Liquid under pressure, supplied through an inlet 37, normally holds a tubular non-return valve 38 open, against a spring 39, and so obtains access to a line 40 controlled by the middle land of the control valve 36. The hydraulic pressure also urges to the right, as seen in Fig. 1, against a spring 42, a piston 43, thereby holding a non-return valve 44 open against its spring 45. This places in communication with an exhaust outlet 46 lines 47 controlled by the outer lands of the control valve 36.

During normal operation of the jack, the link 32 will, on movement of the input member 29, pivot about the point 33 and displace the control valve 36 to connect, in conventional fashion, through lines 48, 49 one end of the cylinder 13 to pressure and the other to exhaust. The cylinder 13 will then move, in the same direction as the control valve 36, until the housing 25, which travels with it, causes the lands of the control valve again to mask the ports in the housing communicating with the lines 40, 47. The cylinder 13 thus moves to an extent and in a direction determined by the movement of the input member 29.

In the event of failure of the hydraulic pressure, the non-return valves 38, 44 close to trap liquid in the jack. Manual operation of the jack is then possible by moving the input member 29 sufficiently for it to actuate one or other of the stops 24 to move the jack cylinder 13. When the input member 29 is so moved, the central land of the control valve 36 opens a port 50 to allow, as described in U. S. application Serial No. 785,837, now Patent No. 2,566,273, trapped liquid to circulate from one end of the cylinder to the other through one or other of a pair of non-return valves 71.

The collapsible member 23, part of which is shown in more detail in Figs. 2, 2a and 2b, serves to deal with the contingency of the control valve 36 seizing in its housing 25 during normal hydraulic operation of the jack. It comprises a cylindrical tube 51, which is a close fit in a cavity in the housing 22 and free to slide therein, a plunger 52 slidable in the tube 51, a plurality of balls 53, and a compression spring 54. The tube 51 is pivoted at 33 to the link 32 and the spring 54 is mounted in compression between the head of the plunger 52 and the end of the tube 51. The balls 53 project through holes 55 in the tube 51 and into holes 56 in the housing 22 and normally the outer and smaller portion of each ball 53 projects into and fits closely within the holes 55, 56. The plunger 52 has an inwardly tapering head 57 which presses the balls 53 outwards into the position shown in Fig. 2. The centre Z of the ball is then well above the line AB, drawn normally to the face of the plunger 52 from the edge of the hole 56 in the housing 22. This ensures a firm lock.

The balls 53 consequently resist sliding movement of the tube 51 in relation to the housing 22, as such movement would result in the balls riding inwardly down the tapered face of the head 57 and consequently in movement of the plunger 52 to the right, thereby increasing the compression of the spring 54. When, however, the load seeking to move the tube 51 axially in relation to the housing 22, and imposed thereon by the pilot in the effort to free the control valve 36, when seized, reaches a predetermined limit, the balls 53 will be moved inwardly to an extent sufficient for them to cease resisting movement of the tube 51, with the result that the member 23 is collapsed.

Fig. 2a shows the tube 51 moved to the left, from the position of Fig. 2, sufficiently for the ball to have just disengaged from the hole 56, the plunger 52 not having followed up the movement of the tube. Fig. 2b shows the position after the plunger has followed up the movement of the sleeve, and it will be seen that the centre Z of the ball lies inside the line XY, drawn normally to the face of the plunger from the point of contact of the ball with the rim of the hole in the tube 51. Consequently the ball will move inwardly into the cavity in the tube. If desired, the head 57 of the plunger may terminate at the location at which it is contacted by the balls, when in the positions indicated in Fig. 2b, so that the balls will immediately roll around the corners at the end of the plunger on further inward movement from the position shown in Fig. 2b.

The resetting plug 58, having a conical head 59, may be moved into the tube 51, to reset the member 23. After the tube 51 has been moved back into position to align the holes 55 with the holes 56, pressure on the plug 58 will force the balls 53 back into the position shown in Fig. 1.

Mounted within the tubular-non-return valve 38 is a closely fitting plunger 60. This plunger is normally held down by a leaf spring 61, one end of which is attached to a member 62 pivoted at 63 to the housing 27, and the other end of which carries a catch 64 engaging a corresponding catch 65 on the tube 51. When the member 23 collapses, the pressure of the spring 61 on the plunger 60 is relieved, and the liquid pressure in the system operates, as fully described in U. S. application Serial No. 164,655 now Patent No. 2,597,419, to raise the plunger 60, thereby causing a collar 68 on the plunger to close the valve 38 and cut off the pressure supply. Upward movement of the plunger 60 also opens a by-pass connection between opposite ends of the cylinder 13.

The collapsible member 123 shown in Figs. 3 and 4 normally serves to communicate bodily movement from an input member 129 to a link 122, constituting the outer housing of the collapsible member. This, as described in U. S. application Serial No. 164,654 now Patent No. 2,597,418, imparts equal movement to a pair of members 29, 29ª, pivoted to opposite ends 124, 124ª of the link 122. Each of the members 29, 29ª serves to operate the control valve of one of a pair of duplicated hydraulic jacks. The end of the input member 129 is bifurcated to embrace the link 122 and is keyed at 130 (Fig. 4) to the tube 51.

If one of the control valves seizes, the associated member 29, or 29ª ceases to move and holds the associated pivot 124 or 124ª stationary. The force applied to the input member 129 will then tend to rotate the link 122 about the stationary pivot 124 or 124ª. When the force so applied reaches a given limit, the balls 53 will be forced inward, pressing the plunger 52 back against its spring 54, thus collapsing the member 123. Movement of the member 129 will thereafter cause the link 122 to pivot in relation to it, turning on the stationary pivot to actuate the member 29 or 29ª associated with the free control valve.

What I claim as my invention and desire to secure by Letters Patent is:

1. In a hydraulic servomotor having a control valve, the combination of a housing, a tube fitting within a recess in the housing, a link pivoted to said tube at a point outside the housing and also pivotally connected to said control valve, an input member for rocking said link about its point of connection to the tube and thereby imparting movement to the control valve, a ball within the tube, a plunger mounted to slide in the tube and having a tapered head, and a spring pressing the head of the plunger against the ball, said plunger normally pressing the ball to a position in which its outer portion engages with aligned holes in the tube and in the housing to resist movement of the tube in relation to the housing, and said tube having a cavity, adjoining the ball at the side thereof remote from the plunger, into which the ball will move and in which said ball will be retained in the event of application, from the input member, due to the control valve seizing, of a predetermined force to the tube, movement of said ball into said cavity permitting said tube to slide freely in the recess in said housing.

2. In combination, a link pivoted at its opposite ends to a pair of output members by pivots having parallel axes, a tube mounted in a cylindrical recess in the link and extending parallel to the axes of said pivots, an input member for imparting movement to the tube in a direction transverse to its axes, a ball in the tube, a plunger mounted to slide in the tube and having a tapered head, and a spring pressing the head of the plunger against the ball, said plunger normally pressing the ball outwardly to a position in which its outer portion engages aligned holes in the tube and link to lock the link to the tube, and said tube having a cavity adjoining the ball at the side thereof remote from the plunger into which the ball will move and in which said ball will be retained, in the event of excessive resistance to movement of one of the output members, to permit the link to pivot in relation to the tube.

3. A member adapted to collapse under a predetermined load and comprising an outer housing, an inner tube fitting within a recess in the housing, a ball within the tube, a plunger mounted to slide in the tube and having a tapered head, and a spring pressing the head of the plunger against the ball, said plunger normally pressing the ball to a position in which its outer portion engages with aligned holes in the tube and in the housing to resist movement of the tube in relation to the housing, said tube having a cavity, adjoining the ball at the side thereof remote from the plunger, adapted to receive and retain said ball, and said tube and plunger being so dimensioned that, on application to the member of a predetermined force tending to move the tube relatively to the housing, said ball will move into and be retained by said cavity to permit thereafter of free movement of the tube relatively to the housing.

4. A member adapted to collapse under a predetermined load and comprising an outer housing, an inner tube fitting within a recess in the housing, a ball within the tube, a plunger mounted to slide in the tube and having a head formed with a taper, the tapering face of said plunger being inclined at about 45° to the axis of said tube, and a spring mounted in compression in said tube between said plunger and an abutment in said tube and normally holding the tapered face of said plunger against said ball to press the ball to a position in which its outer portion engages with aligned holes in the tube and in the housing to resist movement of the tube in relation to the housing, said tube having a cavity, adjoining the ball at the side thereof remote from the plunger, adapted to receive and retain said ball, and said tube being so dimensioned that, on application to the member of a predetermined force tending to move the tube relatively to the housing, said ball will move into and be retained by said cavity to permit thereafter of free movement of the tube relatively to the housing.

5. A member adapted to collapse under a predetermined load and comprising an outer housing, an inner tube fitting within a recess in the housing, a plurality of balls of the same size within the tube, said balls being arranged in a circle and spaced circumferentially in relation to the tube, a plunger mounted to slide in the tube and having a tapered head, and a spring mounted in compression in said tube between said plunger and an abutment in the tube and pressing the tapered head of the plunger against the balls to hold them normally in engagement with aligned holes in the tube and in the housing to resist movement of the tube in relation to the housing, said tube having a cavity, adjoining the balls at the side thereof remote from the plunger, adapted to receive and retain said balls, and the dimensions of said tube and plunger being such that, on application to the member of a predetermined force tending to move the tube relatively to the housing, said balls will move into and be retained by said cavity to permit thereafter of free movement of the tube relatively to the housing.

6. A member as claimed in claim 5, comprising a cone-ended resetting plunger disposed at the end of the tube remote from the spring-loaded plunger and movable axially within the tube, after the member has collapsed and the holes in the tube have been re-aligned with those in the housing, to force the balls outwardly from the cavity into engagement with said holes.

ROY WESTBURY.

REFERENCES CITED

The following references are of record in the file of this patent:

UNITED STATES PATENTS

| Number | Name | Date |
|---|---|---|
| 871,110 | Comings | Nov. 19, 1907 |
| 1,935,715 | Hunt | Nov. 21, 1933 |
| 2,273,334 | Shakespeare | Feb. 17, 1942 |
| 2,516,642 | Murphy | July 25, 1950 |
| 2,539,328 | Sabatini et al. | Jan. 23, 1951 |